(12) United States Patent
Hartman et al.

(10) Patent No.: US 7,536,571 B2
(45) Date of Patent: *May 19, 2009

(54) SYSTEM AND METHOD TO MAINTAIN DATA PROCESSING SYSTEM OPERATION IN DEGRADED SYSTEM COOLING CONDITION

(75) Inventors: Steven Paul Hartman, Round Rock, TX (US); Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/947,072

(22) Filed: Nov. 29, 2007

(65) Prior Publication Data

US 2008/0077282 A1 Mar. 27, 2008

Related U.S. Application Data

(63) Continuation of application No. 10/880,265, filed on Jun. 29, 2004, now Pat. No. 7,353,409.

(51) Int. Cl.
*G06F 1/00* (2006.01)
*G06F 1/32* (2006.01)
*G01R 31/02* (2006.01)

(52) U.S. Cl. .................. 713/300; 713/320; 324/760
(58) Field of Classification Search ............... 713/300
See application file for complete search history.

(56) References Cited

U.S. PATENT DOCUMENTS

| 5,490,059 | A | | 2/1996 | Mahalingaiah et al. |
| 5,498,971 | A | * | 3/1996 | Turnbull et al. ............. 324/760 |
| 5,630,110 | A | | 5/1997 | Mote, Jr. |
| 5,721,837 | A | | 2/1998 | Kikinis et al. |
| 5,737,614 | A | | 4/1998 | Durham et al. |
| 5,760,636 | A | | 6/1998 | Noble et al. |
| 5,948,106 | A | * | 9/1999 | Hetherington et al. ...... 713/501 |
| 6,029,006 | A | * | 2/2000 | Alexander et al. .......... 713/323 |
| 6,147,508 | A | | 11/2000 | Beck et al. |
| 6,871,119 | B2 | | 3/2005 | Samson et al. |
| 7,036,030 | B1 | | 4/2006 | Altmejd |
| 7,062,394 | B2 | | 6/2006 | Sun |
| 7,062,933 | B2 | | 6/2006 | Burns et al. |
| 2004/0088593 | A1 | | 5/2004 | Park |
| 2005/0040810 | A1 | | 2/2005 | Poirier et al. |

FOREIGN PATENT DOCUMENTS

JP 02105213 A 4/1990

* cited by examiner

*Primary Examiner*—Suresh K Suryawanshi
(74) *Attorney, Agent, or Firm*—Yee & Associates, P.C.; Diana R. Gerhardt

(57) ABSTRACT

A method, computer program product, and a data processing system for maintaining operation of the data processing system in the event of a degraded system cooling condition is provided. A first temperature of a processor is identified as equaling or exceeding a processor throttling threshold. The operational frequency of the processor is reduced by a first frequency increment. The operational voltage of the processor is then reduced by a first voltage increment. Updated values of the processor temperature are periodically obtained and continued reductions in the frequency and operational voltage are made until the temperature indicates that the processor is operating in a stable throttle range. The frequency and operational voltage of the processor may be returned to normal levels when an updated temperature of the processor is less or equal to a throttle off threshold.

12 Claims, 6 Drawing Sheets

SYSTEM AND METHOD TO MAINTAIN DATA PROCESSING SYSTEM OPERATION IN DEGRADED SYSTEM COOLING CONDITION

This application is a continuation of application Ser. No. 10/880,265, filed Jun. 29, 2004, now U.S. Pat. No. 7,353,409.

BACKGROUND OF THE INVENTION

1. Technical Field

The present invention relates generally to an improved data processing system and in particular to a system and method for maintaining operation of a data processing system in a degraded system cooling condition. Still more particularly, the present invention provides a system and method for scaling a processor frequency and operational voltage responsive to identification of a degraded system cooling condition.

2. Description of Related Art

Scalable clock-frequency processors consume more power and generate more heat when running at higher clock speeds. Robust cooling mechanisms are required to maintain adequate cooling for proper operation. In the event that a system's cooling mechanism is temporarily degraded, the system may be shut down by a service processor or other device on detection that the processor's junction temperature has reached a critical temperature. Such mechanisms reduce the likelihood of critical damage to the processor. However, service interruption required to prohibit thermal damage to the processor is often inconvenient and undesirable.

Thus, it would be advantageous to provide a mechanism for maintaining operation of a data processing system in the event of a degraded cooling condition. It would be further advantageous to provide a system and method for detecting a degraded system cooling condition and modify the system operation such that a system shutdown is not required.

SUMMARY OF THE INVENTION

The present invention provides a method, computer program product, and a data processing system for maintaining operation of the data processing system in the event of a degraded system cooling condition. A first temperature of a processor is identified as equaling or exceeding a processor throttling threshold. A frequency of the processor is reduced by a first frequency increment. An operational voltage of the processor is then reduced by a first voltage increment. Updated values of the processor temperature are periodically obtained and continued reductions in the frequency and operational voltage are made until the temperature indicates that the processor is operating in a stable throttle range. The frequency and operational voltage of the processor may be returned to normal levels when an updated temperature of the processor is less or equal to a throttle off threshold.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
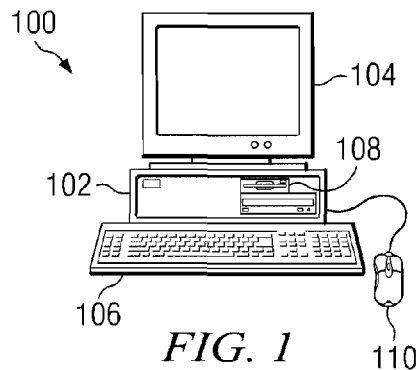
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
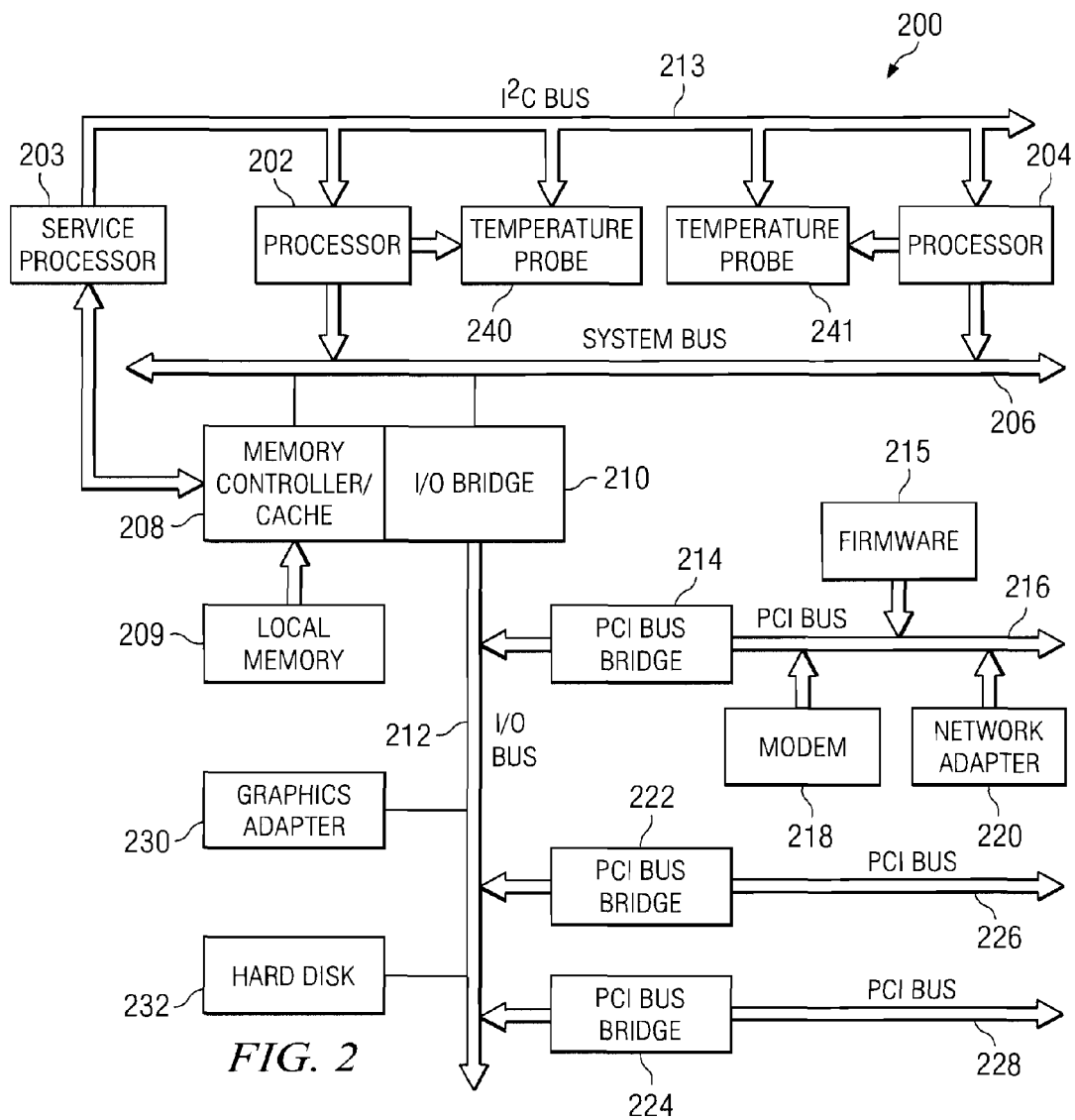
FIG. 2 is a block diagram of a data processing system shown in which a preferred embodiment of the present invention may be implemented.

Referring to FIG. 2, a block diagram of a data processing system, such as computer 100 shown in FIG. 1, adapted to maintain operation in the event of a degraded system cooling condition is depicted in accordance with a preferred embodiment of the present invention. Data processing system 200 may be a symmetric multiprocessor (SMP) system including a plurality of processors 202 and 204 connected to system bus 206. For example, processors 202 and 204 may be implemented as respective 970 PowerPC processors manufactured by International Business Machines Corporation of Armonk, N.Y., or a similarly functional processor device. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Temperature probes 240 and 241 are interconnected with processors 202 and 204 and I²C bus 213. Service processor 203 is also connected with processors 202 and 204 via a bus, such as I²C bus 213. Service processor 203 preferably includes instructions for generating a temperature alert to a firmware-stored processor throttling routine running on one or more of host processors 202 and 204 in response to identifying a degraded system cooling condition as described below. Temperature probes 240 and 241 report a real-time voltage across the junction temperature diode of respective processors 202 and 204. Service processor 203 periodically takes the diode forward voltage readings, converts them into temperature measurements, and compares the temperature measurement with a temperature threshold to generate a warning temperature alert.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients data processing systems may be provided through modem 218 and network adapter 220 connected to PCI local bus 216 through add-in connectors. Additionally, a system firmware 215 may be connected to local bus 216. Preferably, system firmware 215 maintains a processor throttling routine as a set of instructions that are retrieved and executed by processor 202 or 204 responsive to a directive issued by service processor 203.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM JS20 blade eServer pSeries system, a product of International Business Machines Corporation in Armonk, N.Y., running the Advanced Interactive Executive (AIX) operating system or LINUX operating system.

Figure 3:
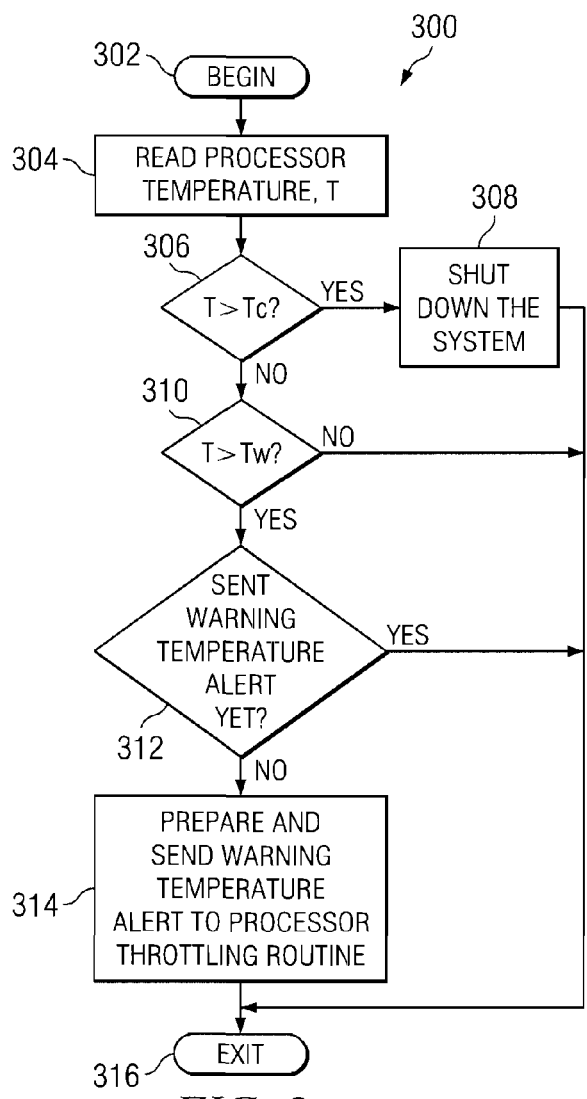
FIG. 3 is a flowchart of processing performed by a temperature exception routine periodically executed by a service processor or other suitable computational device for invoking a processor throttling routine in accordance with a preferred embodiment of the present invention.

FIG. 3 is a flowchart of processing performed by a temperature exception routine periodically executed by a service processor or other suitable computational device for invoking a processor throttling routine in accordance with a preferred embodiment of the present invention. The temperature exception routine may be stored and executed by service processor 203. The temperature exception routine begins (step 302), for example on the periodic expiration of an internal timer run by service processor 203, and a junction temperature (T) of a processor, such as processor 202, is read or calculated by service processor 203 via a temperature probe, such as temperature probe 240 (step 304). In the illustrative examples, reference to a junction temperature acquired from processor 202 is for illustrative purposes only, and such a junction temperature may be obtained and processed in a similar manner from any other processor, such as processor 204. The junction temperature is then compared with a predefined critical temperature ($T_c$) (step 306). As referred to herein, a critical temperature is a predefined temperature threshold above which continued operation may result in damage or destruction to processor 202 and, in response to identification of a junction temperature exceeding the critical temperature, at which a system shutdown is to be invoked in accordance with a preferred embodiment of the present invention. Accordingly, in the event that the junction temperature T of a processor of data processing system 200 exceeds the critical temperature $T_c$, service processor 203 invokes a system shutdown of data processing system 200 (step 308) to protect the processor from thermal damage and then exits (step 316).

In the event that the junction temperature is determined to be less than the critical temperature at step 306, the junction temperature is compared with a warning temperature $T_w$ (step 310). As referred to herein, the warning temperature is a predefined temperature threshold indicative of a potential degraded system cooling condition and may be defined in, or alternatively retrieved by, the temperature exception routine, and at which a warning temperature alert is to be sent from service processor 203 to the host system firmware 215. If the junction temperature is not greater than the warning temperature, the temperature exception routine cycle then exits according to step 316. If the junction temperature is determined to exceed the warning temperature at step 310, the temperature exception routine proceeds to evaluate whether a warning temperature alert has been generated (step 312). For example, on a first evaluation of a junction temperature in excess of the warning temperature, the temperature exception routine preferably generates a warning temperature alert and sends the alert to a processor throttling routine. If the warning temperature alert has previously been sent to the processor throttling routine, the temperature exception routine cycle then exits according to step 316. Alternatively, if the warning temperature alert has not been sent to the processor throttling routine, the alert is then generated and sent to the processor throttling routine (step 314), and the temperature exception routine cycle exits according to (step 316).

Figure 4A:
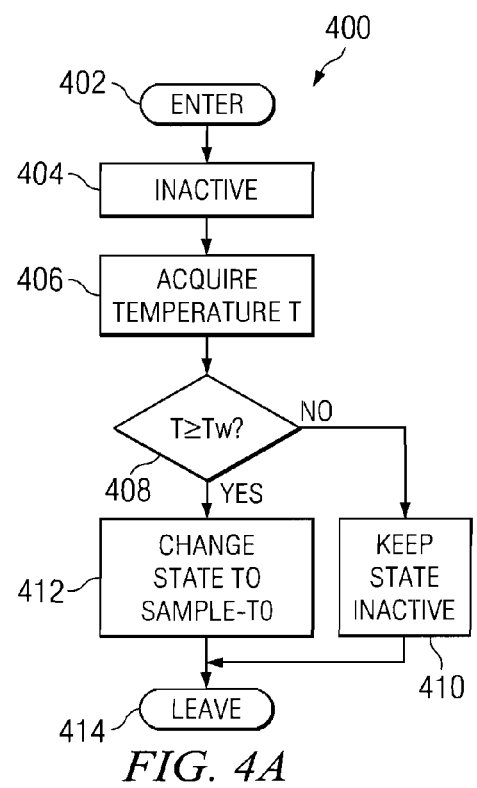
FIG. 4A is a flowchart including a state transition of processing performed by a processor throttling routine when a processor enters the routine in an inactive state in accordance with a preferred embodiment of the present invention.

FIG. 4A is a flowchart including a state transition of processing performed by a processor throttling software state machine routine (also referred to herein as the processor throttling routine) when a processor, such as processor 202, enters the routine in an inactive (INACTIVE) state in accordance with a preferred embodiment of the present invention. The processor throttling routine is preferably stored in firmware 215 as a set of computer readable instructions that are fetched from firmware 215 and executed by processor 202 or 204 upon receipt of a warning temperature alert. Processor 202 is dispatched to enter the processor throttling routine (step 402), and processor 202 begins execution of the processor throttling routine in an inactive (INACTIVE) state (step 404). The junction temperature is acquired by the processor throttling routine (step 406). For example, the junction temperature T may be conveyed to processor 202 executing the processor throttling routine by service processor 203. The processor throttling routine then compares the junction temperature with the warning temperature (step 408). In the event the junction temperature is less than the warning temperature thus indicating that the thermal cooling condition of the system has improved since the temperature alert generation by service processor 203, the processor throttling routine remains in the inactive state (step 410). Subsequently, processor 202 exits the processor throttling routine and will not be re-dispatched to re-enter the processor throttling routine until receipt of another warning temperature alert (step 414).

Returning again to step 408, if the junction temperature is determined to equal or exceed the warning temperature, the processor throttling routine then changes the processing state to a temperature sampling state (SAMPLE-T0) (step 412) as described below with reference to FIG. 4B. The processor then leaves the processor throttling routine to be re-dispatched at a later time.

Figure 4B:
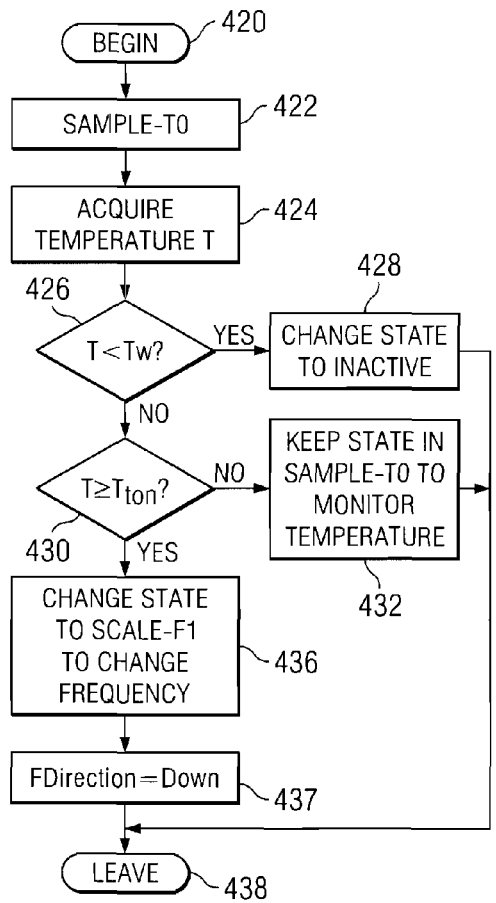
FIG. 4B is a flowchart of processing and the state transition performed when the processor throttling routine is invoked in a temperature sampling state SAMPLE-T0 in accordance with a preferred embodiment of the present invention is shown

With reference now to FIG. 4B, a flowchart of processing and the state transition performed by the processor throttling routine when the processor throttling routine is invoked in the temperature sampling state SAMPLE-T0 in accordance with a preferred embodiment of the present invention is shown. The processing steps shown in FIG. 4B are invoked (step 420) when processor 202 is re-entering the processor throttling routine responsive to the state change of step 412 and the subsequent exiting of the inactive state of step 414 in FIG. 4A. The processor throttling routine is set in the temperature sampling state SAMPLE-T0 (step 422), and an updated junction temperature T of processor 202 is acquired (step 424). The junction temperature is then compared with the warning temperature (step 426). In the event that the junction temperature is less than the warning temperature thus indicating that the thermal condition is improving, the processor throttling routine state is changed to INACTIVE for the next re-entrance of the processor throttling routine (step 428), and processor 202 then exits the processor throttling routine to re-enter in the INACTIVE state at a later time (step 438).

Returning again to step 426, if the junction temperature is determined to equal or exceed the warning temperature at step 426, the junction temperature is then compared with a throttle on temperature threshold ($T_{ton}$) (step 430). The throttle on temperature threshold $T_{ton}$ is a predefined processor throttling threshold at which clock frequency and operational voltage throttling of the processor is to be performed. In the event that the junction temperature is determined to be less than the throttle on temperature threshold, the processor throttling routine is maintained in the temperature sampling state SAMPLE-T0 (step 432) and processor 202 then leaves the processor throttling routine (step 438) for later re-entry in the temperature sampling state SAMPLE-T0. Alternatively, if the junction temperature is determined to equal or exceed the throttle on temperature threshold at step 430, the processor throttling routine state is changed to a frequency scaling state (SCALE-F1) (step 436) for the next re-entrance of the processor throttling routine. A frequency scaling direction flag (FDirection) that specifies whether the clock frequency is to be scaled up or down is then set to Down (step 437), and the processor leaves the processor throttling routine according to step 438 for later re-entry in the frequency scaling state SCALE-F1.

Figure 4C:
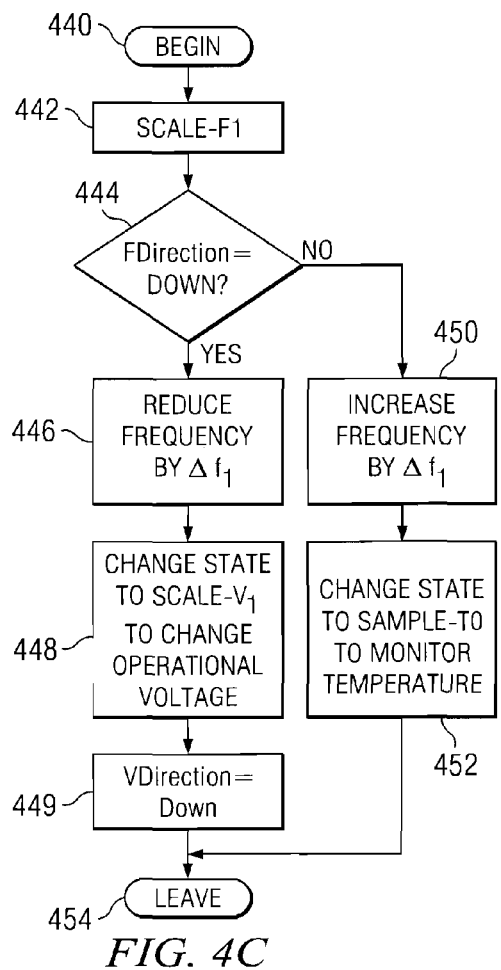
FIG. 4C is a flowchart of processing and the state transition performed when the processor throttling routine is invoked in a frequency scaling state SCALE-F1 in accordance with a preferred embodiment of the present invention is shown.

With reference now to FIG. 4C, a flowchart of processing and the state transition performed by the processor throttling routine when the processor throttling routine is invoked in the frequency scaling state SCALE-F1 in accordance with a preferred embodiment of the present invention is shown. The processing steps shown in FIG. 4C are invoked (step 440) when processor 202 is re-entering the processor throttling routine responsive to the state change of step 436 and the subsequent exiting of the temperature sampling state SAMPLE-T0 of step 438 in FIG. 4B. The processor throttling routine state is set to the frequency scaling state SCALE-F1 (step 442). An evaluation of the frequency scaling direction flag is made (step 444) to determine if the processor throttling routine is to throttle or restore the clock frequency of processor 202. If the frequency scaling direction is set to Down, the frequency scaling subroutine reduces the processor clock frequency by a frequency increment $\Delta f1$ (step 446). For example, the frequency increment may be implemented as a predefined number of master clock circuit parameter counts of processor 202. Preferably, the time base clock frequency remains constant in data processing system 200 while only the clock frequency is reduced. The processor throttling routine state is then changed to a voltage scaling state (SCALE-V1) (step 448) for the next re-entry into the processor throttling routine, and a voltage scaling direction flag (VDirection) that indicates whether the operational voltage is to be throttled or restored is then set to Down (step 449). Processor 202 then exits the processor throttling routine for later entry in the voltage scaling state SCALE-V1 (step 454).

Returning again to step 444, in the event that the frequency scaling direction flag is not set to Down, the clock frequency of the processor is increased by the frequency increment $\Delta f1$ (step 450). The processor throttling routine state is then returned to the temperature sampling state SAMPLE-T0 to monitor for changes in the thermal conditions of the processor after the latest restoration of the clock frequency (step 452), and the processor throttling routine then exits according to step 454 for later re-entry in the temperature sampling state SAMPLE-T0.

Figure 4D:
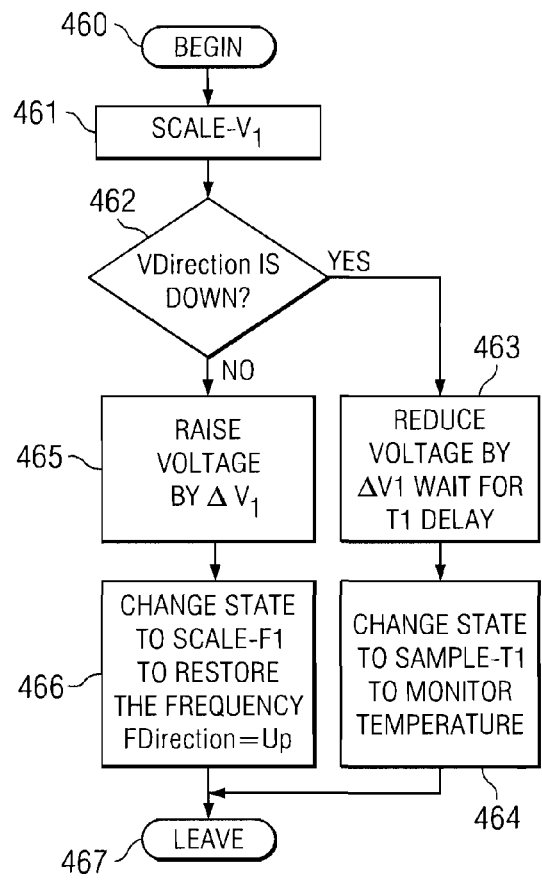
FIG. 4D is a flowchart of processing and the state transition performed when the processor throttling routine is entered in a voltage scaling state SCALE-V1 implemented in accordance with a preferred embodiment of the present invention is shown.

With reference now to FIG. 4D, a flowchart of processing and the state transition performed when the processor throttling routine is entered in the voltage scaling state SCALE-V1 implemented in accordance with a preferred embodiment of the present invention is shown. The processor throttling routine is re-entered (step 460) and is set in the voltage scaling state SCALE-V1 (step 461). An evaluation of the voltage scaling direction flag VDirection is made (step 462) to determine whether voltage scaling or restoration is to be performed. If the voltage scaling direction flag is evaluated as Down, the voltage scaling subroutine reduces the voltage by a predefined voltage increment $\Delta V1$ (step 463), e.g., a voltage increment of 25 mV. Additionally, a delay period T1 may be executed after the reduction of the operational voltage. The state of the processor throttling routine is then changed to a temperature sampling state SAMPLE-T1 as described below in FIG. 4E to monitor the processor temperature after the described clock frequency and operational voltage reductions (step 464). Processor 202 then exits the processor throttling routine for later re-entry in the temperature sampling state SAMPLE-T1 (step 467).

In the event that the voltage scaling direction flag is not evaluated as Down at step 462, the processor throttling routine then increases the voltage by the voltage increment $\Delta V1$ (step 465). The processor throttling routine state is then changed to a frequency scaling state SCALE-F1 and the frequency scaling direction flag FDirection is set to Up (step 466) for restoring the clock frequency of the processor as described above with reference to FIG. 4C. The processor throttling routine then exits for later re-entry in the frequency scaling state SCALE-F1 according to step 467.

Figure 4E:
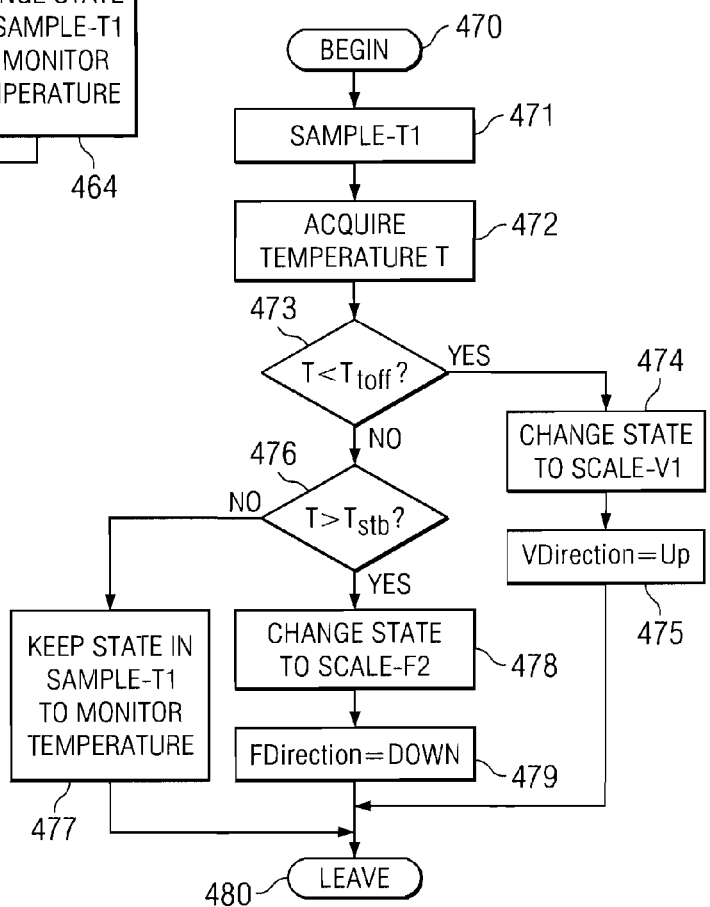
FIG. 4E is a flowchart of processing and the state transition performed when the processor throttling routine is entered in a temperature sampling state SAMPLE-T1 implemented in accordance with a preferred embodiment of the present invention is shown.

With reference now to FIG. 4E, a flowchart of processing and the state transition performed by the processor throttling routine when the processor throttling routine is entered in the temperature sampling state SAMPLE-T1 implemented in accordance with a preferred embodiment of the present invention is shown. The processor throttling routine is re-entered (step 470) and is set in the temperature sampling state SAMPLE-T1 (step 471). An updated junction temperature is acquired (step 472). The junction temperature is compared with a predefined throttle off threshold $T_{toff}$ (step 473). The throttle off temperature threshold is a predefined temperature below which a junction temperature indicates an improved thermal condition such that a system restoration may begin. That is, a junction temperature below the throttle off temperature threshold indicates that processor throttling may be deactivated and the clock frequency and operational voltage may be stepped up to normal operational levels. Accordingly, the processor throttling routine state is set to the voltage scaling state SCALE-V1 described above with reference to FIG. 4D (step 474), and the voltage scaling direction flag VDirection is set to Up (step 475). Processor 202 then exits the processor throttling routine (step 480) for later re-entry in the voltage scaling state SCALE-V1.

Returning again to step 473, in the event that the junction temperature is evaluated as greater than or equal to the throttle off threshold, the junction temperature is then compared to a stable temperature threshold ($T_{stb}$) (step 476). As referred to herein, a stable temperature threshold is a predefined temperature at or below which the junction temperature has been sufficiently reduced such that additional clock frequency and operational voltage reductions are unnecessary and at which the processor may continue to operate at the currently throttled clock frequency and operational voltage levels without imparting damage to the processor. Thus, in the event that the junction temperature is determined to be less or equal to the stable throttle temperature threshold, the state of the processor throttling routine is maintained in the temperature sampling state SAMPLE-T1 described with reference to FIG. 4E (step 477), and processor 202 exits the processor throttling routine according to step 480 for later re-entry in the temperature sampling state SAMPLE-T1.

Returning again to step 476, in the event that the junction temperature is determined to exceed the stable throttle temperature threshold thus indicating that additional processor throttling is required, the state of the processor throttling routine is changed to a frequency scaling state (SCALE-F2) (step 478), and the frequency scaling direction flag FDirection is set to Down (step 479). Processor 202 then exits the processor throttling routine according to step 480 for later re-entry in the frequency scaling state SCALE-F2.

Figure 4F:
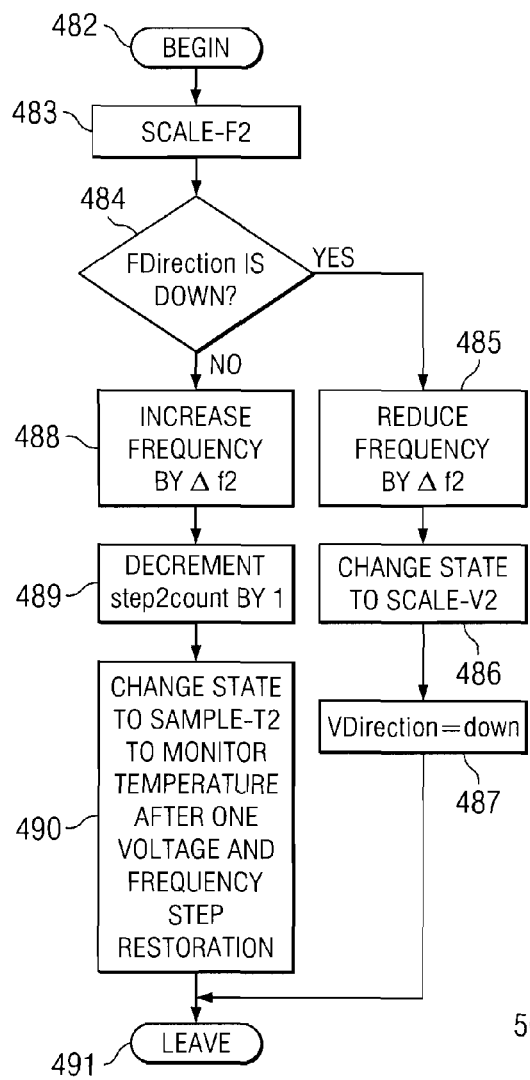
FIG. 4F is a flowchart of processing and the state transition performed when the processor throttling routine is entered in a frequency scaling state SCALE-F2 implemented in accordance with a preferred embodiment of the present invention.

With reference now to FIG. 4F, a flowchart of processing and the state transition performed by the processor throttling routine when entered in the frequency scaling state SCALE-F2 implemented in accordance with a preferred embodiment of the present invention is shown. The processor throttling routine is re-entered (step 482) and is set in the frequency scaling state SCALE-F2 (step 483). The frequency scaling direction flag is then evaluated to determine if it is set for processor throttling, that is if it is set to Down (step 484). In the event the frequency scaling direction flag is set to Down, the clock frequency of processor 202 is reduced by a frequency increment Δf2 (step 485). The processor throttling routine state is then set to a voltage scaling state (SCALE-V2) (step 486) described below with reference to FIG. 4G, and the voltage scaling direction flag is set to Down (step 487). Processor 202 then exits the processor throttling routine (step 491) for later re-entry in the voltage scaling state SCALE-V2.

Returning again to step 484, in the event that the frequency scaling direction flag FDirection is set to Up for restoration of the processor clock frequency, the clock frequency of processor 202 is increased by the frequency increment Δf2 (step 488). A counter variable step2count is then decremented (step 489). The counter variable step2count maintains a count of the number of frequency increments Δf2 and voltage increments ΔV2 that have been applied during throttling. Thus, a decrement to the counter variable step2count is applied when a restoration step including respective frequency and voltage increments of Δf2 and ΔV2 have been restored. The processor throttling routine state is then changed to a temperature sampling state SAMPLE-T2 (step 490) described below with reference to FIG. 4H, and processor 202 exits the processor throttling routine according to step 491 for later re-entry in the temperature sampling step SAMPLE-T2.

Figure 4G:
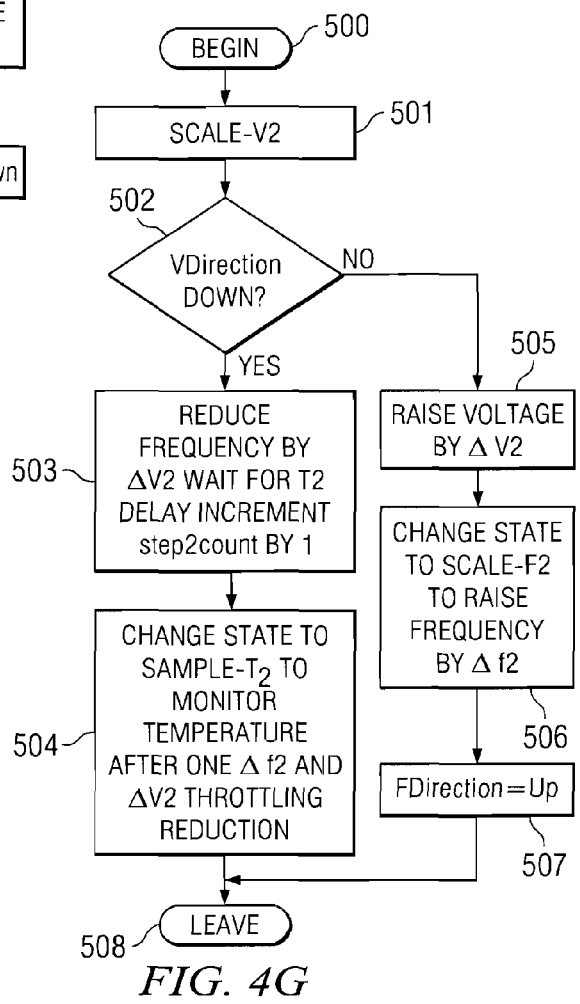
FIG. 4G is a flowchart of processing and the state transition performed when the processor throttling routine is entered in a voltage scaling state SCALE-V2 implemented in accordance with a preferred embodiment of the present invention.

With reference now to FIG. 4G, a flowchart of processing and the state transition performed by the processor throttling routine when the processor throttling routine is entered in the voltage scaling state SCALE-V2 implemented in accordance with a preferred embodiment of the present invention is shown. The processor throttling routine is re-entered (step 500) and is set in the voltage scaling state SCALE-V2 (step 501). The voltage scaling direction flag VDirection is then evaluated to determine if it is set for processor throttling, that is if it is set to Down (step 502). In the event the voltage scaling direction flag is set to Down, the operational voltage of processor 202 is reduced by a voltage increment ΔV2, the processor throttling routine observes a delay of T2, and an increment to the counter variable step2count is made (step 503). The processor throttling routine state is then set to the temperature sampling state (SAMPLE-T2) (step 504) to monitor the processor junction temperature described below with reference to FIG. 4H. Processor 202 then exits the processor throttling routine (step 508) for later re-entry in the temperature sampling state SAMPLE-T2.

Returning again to step 502, in the event that the voltage scaling direction flag FDirection is set to Up for restoration of the processor operational voltage, the operational voltage of processor 202 is increased by the voltage increment ΔV2 (step 505). The processor throttling routine state is then changed to the frequency scaling state SCALE-F2 (step 506) described above with reference to FIG. 4F, the frequency scaling direction flag is set to Up (step 507), and processor 202 exits the processor throttling routine according to step 508 for later re-entry in the frequency scaling state SCALE-F2.

Figure 4H:
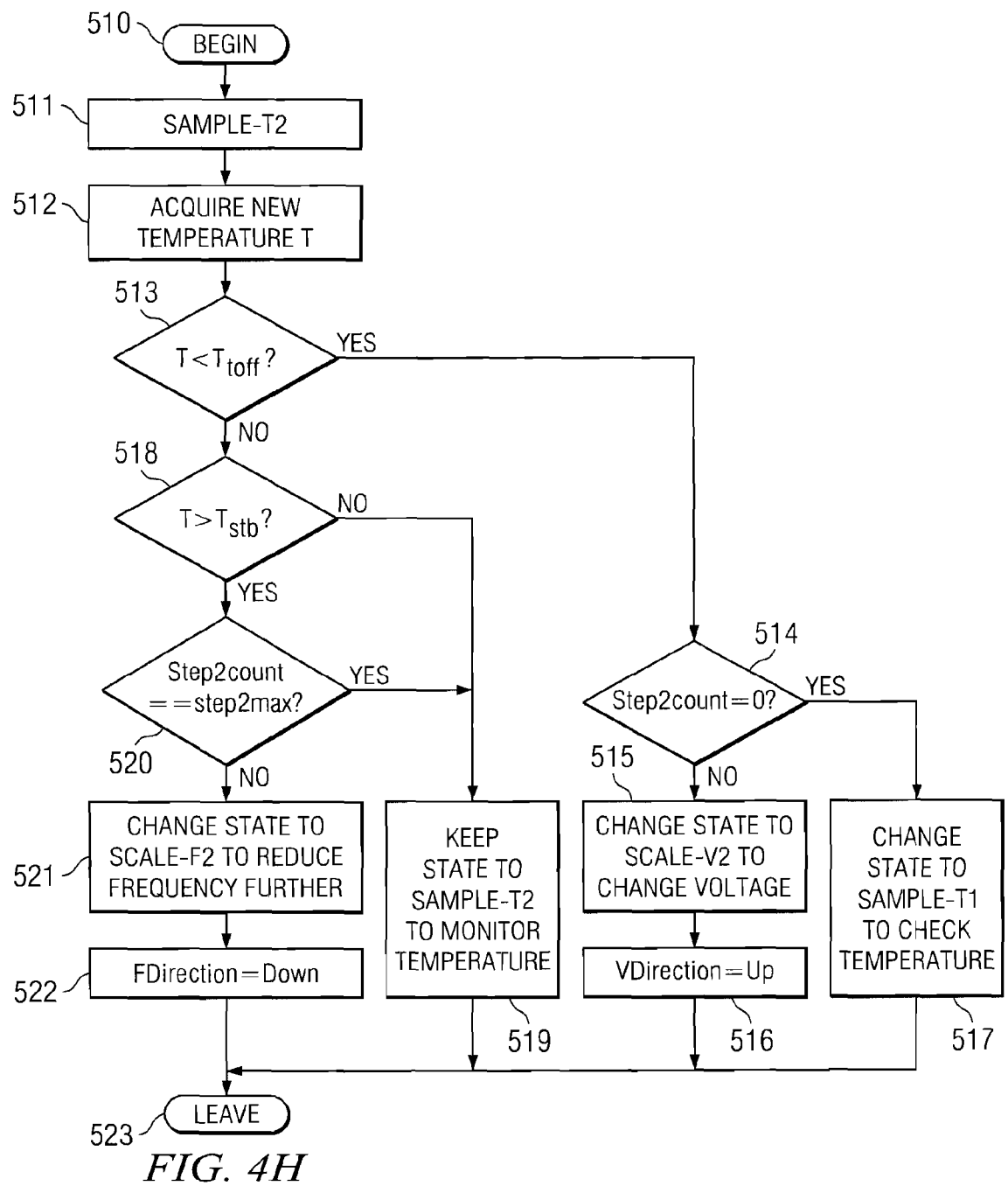
FIG. 4H is a flowchart of processing and the state transition performed when the processor throttling routine is invoked in the temperature sampling state in accordance with a preferred embodiment of the present invention.

With reference now to FIG. 4H, a flowchart of processing and the state transition performed by the processor throttling routine when invoked in the temperature sampling state SAMPLE-T2 in accordance with a preferred embodiment of the present invention is shown. The processor throttling routine is re-entered (step 510) and is set in the temperature sampling state SAMPLE-T2 (step 511). An updated junction temperature T of processor 202 is acquired (step 512). The junction temperature is then compared with the throttle off temperature threshold (step 513). In the event that the junction temperature is less than the throttle off temperature threshold thus indicating that the thermal condition is improving and restoration of the operation voltage and clock frequency of processor 202 may commence, an evaluation of the counter variable step2count is made (step 514). If the counter variable step2count is not equal to zero thus indicating that additional restoration of the clock frequency in increment Δf2 and operational voltage in increment ΔV2 may be performed, the processor throttling routine state is changed to the voltage scaling state SCALE-V2 (step 515) described above in FIG. 4G, and the voltage scaling direction flag VDirection is set to Up (step 516). Processor 202 then exits the processor throttling routine (step 523) for later re-entry in the voltage scaling state SCALE-V2.

Returning again to step 514, if the counter variable step2count is equal to zero thus indicating that all Δf2 frequency steps and all ΔV2 voltage steps have been restored, the processor throttling routine state is changed to the temperature sampling state SAMPLE-T1 (step 517) described above with reference to FIG. 4E, exits the processor throttling routine according to step 523 for later re-entry in the temperature sampling state SAMPLE-T1 to perform a final junction temperature check.

Returning again to step 513, if the junction temperature is greater or equal to the throttle off temperature threshold $T_{toff}$, the junction temperature is then compared with the stable temperature threshold (step 518). In the event the junction temperature is less or equal to the stable temperature threshold, the processor throttling routine is maintained in the temperature sampling state SAMPLE-T2 (step 519) to monitor the junction temperature, and processor 202 exits the processor throttling routine according to step 523 for later re-entry in the temperature sample state SAMPLE-T2.

Returning again to step 518, if the junction temperature is determined to be greater than the stable temperature threshold, the counter variable step2count is compared with a maximum counter variable threshold step2max (step 520). The step2max counter variable threshold defines the maximum number of decrements Δf2 and ΔV2 that can be made to the clock frequency and the operational frequency, respectively. That is, when the counter variable step2count equals the counter variable threshold step2max, no additional processor throttling can be made. Accordingly, the processor throttling routine is maintained in the temperature sampling state SAMPLE-T2 according to step 519 if the counter variable step2count equals the counter variable threshold step2max, and the processor throttling routine then exits according to step 523 for later re-entry in the temperature sampling state SAMPLE-T2. If it is determined that the counter variable step2count does not equal the counter variable threshold step2max at step 520 thus indicating that a further reduction of the clock frequency and operational voltage of processor 202 may be made, the processor throttling routine state is returned to the frequency scaling state SCALE-F2 (step 521) described above in FIG. 4F. The frequency scaling direction flag FDirection is then set to Down, and processor 202 exits the processor throttling routine according to step 523 for later re-entry in the frequency scaling state.

Thus, a mechanism for maintaining operation of a data processing system in the event of a degraded cooling condition is provided. A processor throttling routine of the present invention detects a degraded system cooling condition and modifies the system operation such that a system shutdown is not required. The processor throttling routine is invoked responsive to a processor having a junction temperature in excess of a warning temperature threshold. Operational voltage and frequency of the processor may be stepped down until a temperature of the processor reaches a stable throttling range. When the processor temperature is sufficiently reduces, the operational voltage and frequency of the processor may be stepped up to normal levels. Thus, a system shutdown in response to a degraded system cooling condition is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a computer recordable-type media for maintaining operation of a data processing system in the event of a degraded system cooling condition, the computer program product comprising:

first instructions that receive a first temperature of a processor;

second instructions that, responsive to receipt of the first temperature, identify the degraded system cooling condition;

third instructions that, responsive to the second instructions identifying the degraded system cooling condition, throttle a frequency and operational voltage of the processor, wherein throttling the frequency and operational voltage of the processor comprises:

reducing a frequency of the processor by a first frequency increment;

responsive to reducing the frequency by a first frequency increment, reducing an operational voltage of the processor by a first voltage increment;

responsive to reducing the operational voltage of the processor by the first voltage increment, acquiring a temperature of the processor;

comparing the temperature with a stable throttling temperature range;

responsive to determining that the temperature is not within the stable throttling temperature range, further reducing the frequency of the processor by a second frequency increment;

responsive to reducing the frequency by the second frequency increment, further reducing the operational voltage of the processor by a second voltage increment;

responsive to reducing the frequency of the processor by the second frequency increment and reducing the operational voltage of the processor by the second voltage increment, incrementing a counter variable representing a number of second frequency increment and second voltage increment reductions performed; and wherein the first frequency increment, second frequency increment, first voltage increment, and second voltage increment are specified in a processor throttling routine controlled by system firmware.

2. The computer program product of claim 1, wherein the second instructions compare the first temperature with a warning temperature threshold.

3. The computer program product of claim 2, wherein the second instructions, responsive to determining that the first temperature equals or exceeds the warning temperature threshold, identify the degraded system cooling condition.

4. The computer program product of claim 1, wherein the third instructions throttle the frequency and operational voltage responsive to determining that the first temperature equals or exceeds a processor throttling threshold.

5. The computer program product of claim 1, wherein the third instructions throttle the processor by decreasing the frequency by a predefined increment and decreasing the operational voltage by a predefined increment.

6. The computer program product of claim 1, further comprising:
   fourth instructions that acquire a second temperature of the processor;
   fifth instructions that compare the second temperature with a throttle off threshold; and
   sixth instructions that increase the frequency and operational voltage responsive to the fifth instructions determining that the second temperature is less than or equal to the throttle off threshold.

7. A data processing system adapted to maintain operation in a degraded system cooling condition, comprising:
   a memory that contains a set of instructions;
   a temperature probe; and
   a processing unit connected with the temperature probe that receives a temperature from the temperature probe and, responsive to execution of the set of instructions, identifies a degraded system cooling condition and lowers a frequency and operational voltage of the processing unit, wherein the processor throttles the frequency and operational voltage of the processor by reducing a frequency of the processor by a first frequency increment, reducing an operational voltage of the processor by a first voltage increment in response to reducing the frequency by a first frequency increment, acquiring a temperature of the processor in response to reducing the operational voltage of the processor by the first voltage increment, comparing the temperature with a stable throttling temperature range, further reducing the frequency of the processor by a second frequency increment in response to determining that the temperature is not within the stable throttling temperature range, and further reducing the operational voltage of the processor by a second voltage increment in response to reducing the frequency by the second frequency increment, incrementing a counter variable representing a number of second frequency increment and second voltage increment reductions performed in response to reducing the frequency of the processor by the second frequency increment and reducing the operational voltage of the processor by the second voltage increment, and wherein the first frequency increment, second frequency increment, first voltage increment, and second voltage increment are specified in a processor throttling routine controlled by system firmware.

8. The data processing system of claim 7, wherein system firmware stored within the memory maintains the set of instructions.

9. The data processing system of claim 7, wherein the degraded system cooling condition is identified by comparing the temperature with a warning temperature threshold.

10. The data processing system of claim 7, wherein the processing unit increases the frequency and operational voltage responsive to receipt of a second temperature from the temperature probe that is less than or equal to a throttle off threshold.

11. The data processing system of claim 7, wherein the processing unit periodically receives an updated value of the temperature and responsively lowers the frequency and operational voltage until an updated value of the temperature is within a stable throttling range.

12. The data processing system of claim 7, wherein the processing unit periodically receives an updated value of the temperature and responsively increases the operational voltage and frequency responsive to receipt of an updated temperature that is less than or equal to a throttle off threshold.

* * * * *